United States Patent
Wang et al.

(10) Patent No.: US 12,093,162 B1
(45) Date of Patent: Sep. 17, 2024

(54) BLOCK ANCHORS FOR ONLINE LOG PARSING

(71) Applicant: Amazon Technologies, Inc., Seattle, WA (US)

(72) Inventors: Xiao Wang, Kirkland, WA (US); Jasmeet Chhabra, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 17/703,796

(22) Filed: Mar. 24, 2022

(51) Int. Cl.
G06F 11/36 (2006.01)

(52) U.S. Cl.
CPC ........ G06F 11/3612 (2013.01); G06F 11/364 (2013.01)

(58) Field of Classification Search
None
See application file for complete search history.

(56) References Cited

U.S. PATENT DOCUMENTS

| | | | |
|---|---|---|---|
| 9,195,674 B1 | 11/2015 | Dukes et al. | |
| 10,585,908 B2 | 3/2020 | Russell | |
| 11,055,302 B2 | 7/2021 | Russell et al. | |
| 2014/0282031 A1* | 9/2014 | Hinterbichler | G06F 16/34 715/738 |
| 2016/0092552 A1* | 3/2016 | Morfonios | G06F 16/285 707/737 |
| 2017/0139806 A1* | 5/2017 | Xu | G06F 11/0766 |
| 2018/0165173 A1* | 6/2018 | Lin | G06F 16/285 |
| 2018/0309648 A1* | 10/2018 | Debnath | H04L 43/06 |
| 2021/0382746 A1* | 12/2021 | Sharma | G06F 11/3006 |
| 2022/0019588 A1* | 1/2022 | Jha | G06F 16/1734 |
| 2022/0171670 A1* | 6/2022 | Srivatsa | G06F 40/186 |
| 2023/0093225 A1* | 3/2023 | Chan | G06N 20/00 715/230 |

FOREIGN PATENT DOCUMENTS

WO   WO-2019060326 A1 *  3/2019
WO   WO-2021068547 A1 *  4/2021

OTHER PUBLICATIONS

M. Du and F. Li, "Spell: Online Streaming Parsing of Large Unstructured System Logs," in IEEE Transactions on Knowledge and Data Engineering, vol. 31, No. 11, pp. 2213-2227, Nov. 1, 2019, doi: 10.1109/TKDE.2018.2875442 (Year: 2019).*
Sedki, I., Hamou-Lhadj, A., Ait-Mohamed, O., "AWSOM-LP: An Effective Log Parsing Technique Using Pattern Recognition and Frequency Analysis," Oct. 29, 2021, arXiv:2110.15473v1 [cs.SE] (Year: 2021).*

* cited by examiner

Primary Examiner — Andrew M. Lyons
(74) Attorney, Agent, or Firm — S. Scott Foster; Kowert, Hood, Munyon, Rankin & Goetzel, P.C.

(57) ABSTRACT

Online block parsing techniques are performed that use anchor tokens. When a log entry of a log stream is received, the log entry may be tokenized into an ordered series of log units. The log units may be matched with anchor tokens in previously initialized log templates to determine a matching log template. A log template based on the matching log template may be provided with the tokenized log entry to a destination for a parsed version of the log stream.

20 Claims, 8 Drawing Sheets

BLOCK ANCHORS FOR ONLINE LOG PARSING

BACKGROUND

Logs as machine generated records of run-time system behaviors, is a critical data source for operators to monitor system activities and diagnose operational issues. However, the increasing scale and complexity of logs goes far beyond the level that can be handled manually, and thus there is a huge demand for automatic log processing methods. As logs are presented as free-form text messages, a log parser, which interprets the logging formats of the logs, is usually the first and foremost tool toward other log management and analytics solutions such as query, aggregation, clustering, indexing, pattern extraction and anomaly detection.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for block anchors for online log parsing are described herein. Often, log parsing is heavily relied on ad-hoc, manually designed patterns or scripts. However, this approach only work for logs with certain known structures, and includes domain knowledge of the parser designers. This approach unfortunately does not work well for processing modern cloud-based application logs, due to a couple of reasons as follows. First, the scale and complexity of logs surge rapidly, making a manual parser design increasingly expensive. Second, modern applications and services usually combine a large number of components authored from different developers, and those systems or people evaluating the logs are usually not the systems or people who chose what to log. Third, source codes and logging statements change over time, requiring repetitive work for maintaining and updating those manually designed patterns and scripts for log parsing.

Due to the above reasons, automatic log parsing methodologies received a surge of interest in recent years. One technique in this field is automatic log parsing generation from source codes. However, this type of techniques have limited use in practice because source codes are often not available to operators or log analysis systems due to security and regulation concerns. Alternatively, another type of technique for automatic log parsing is a data-driven technique that features a learning-based log parser which learns to parse logs from the data it processed. This kind of technique does not require domain knowledge or access to the source codes, and thus is particularly favorable for log analysis systems in practice.

Learning-based parsers can be further classified in two categories, offline parsers and online parsers. Offline parsers process all training log data as a whole, and thus often scale poorly. In contrast, an online parser processes log data in a streaming fashion. As online log processors do not use all log data at once, data fetching and log parsing can be conducted in parallel. In various embodiments, block anchors for online log parsing techniques can parse unstructured log data efficiently, learning log templates for use in parsing subsequent log records (which may also support capturing hierarchical log format representation), providing both efficient, and thus faster, performance improvements for systems, services, or applications that rely upon parsed log entries, as well as offering an efficient technique for representing parsed log results utilizing anchor tokens.

Log parsing may be the process of making sense of a log entry that appears as a free-text message by decomposing it into its parts and understanding their semantic characteristics. Log parsing is often the first step that facilitates other common tasks in automatic log analysis such as log clustering or classification, variable extraction, and anomaly detection.

In various embodiments, logs may be originally generated from the execution of printing or logging statements in source code executing various systems, services, or applications that provide the log for analysis. For example, a printing or logging statement may include an invariant skeleton and a number of parameters whose values are to be realized at the runtime. Therefore, logs generated from the same logging statement have stronger structural similarity than those from different logging statements. Logs from the same or similar logging statements may have the same log format (e.g., also referred to as event type in some embodiments). One fundamental objective of log parsing is identifying the log format of a given log entry, and distinguishing the variant parts (i.e. the parameters) from the invariant parts (i.e. the skeleton).

In various embodiments of an online log parser as described herein, the online log parser may identify the log formats automatically and represent them as a log template during the process of parsing a stream of logs, as discussed in detail below with regard to FIGS. 1 and 3-7. In various embodiments, a log template is represented as an ordered series of template tokens, which carry the semantic information of the unit at a certain position in the logs that have the format that the template represents. The semantic information of a template token may distinguish whether the corresponding unit it represents in the log format is an invariant part (e.g., a fixed, static value) or a variable (e.g., with different values for different log records that correspond to the log template).

Figure 1:
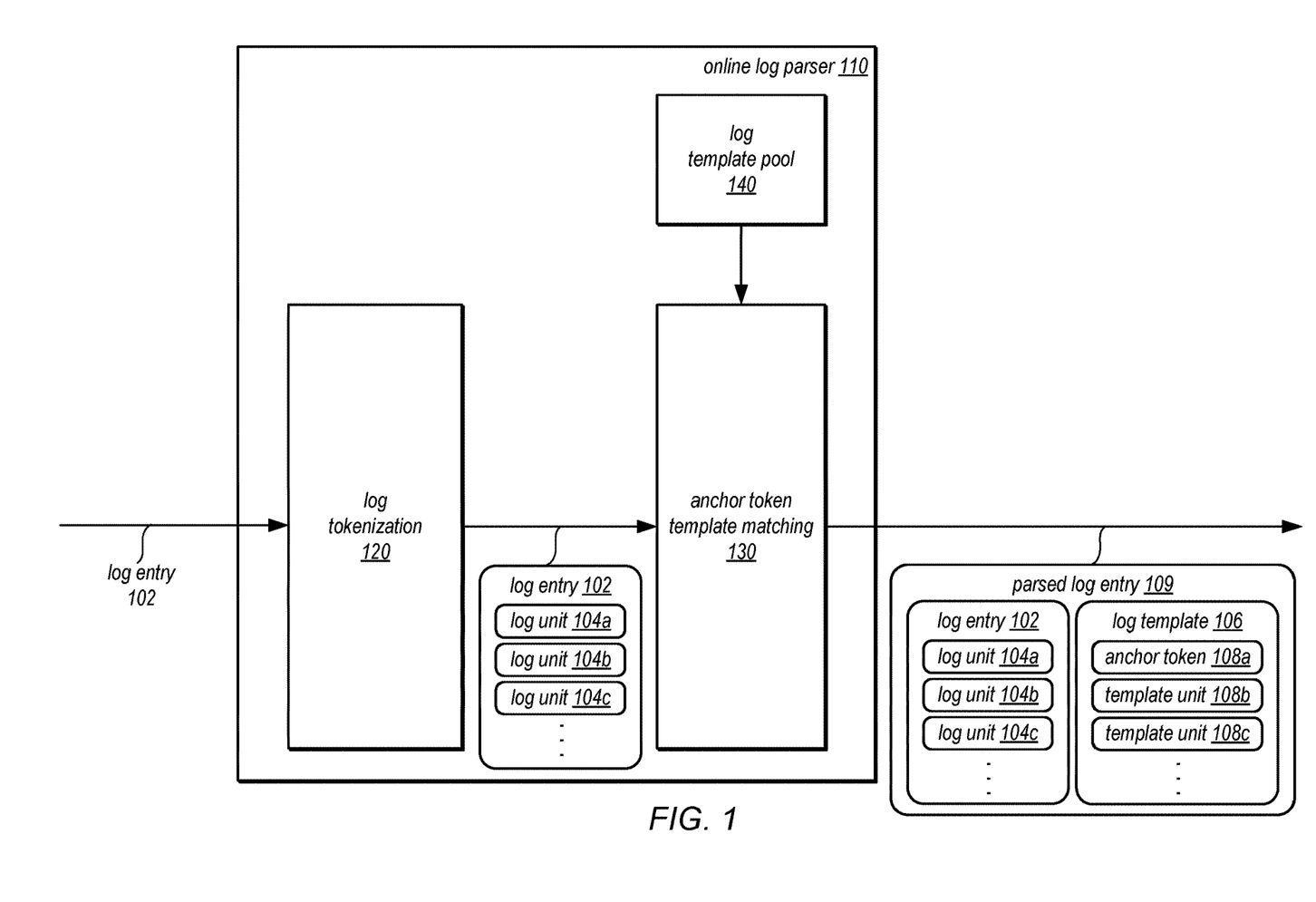
FIG. 1 illustrates a logical diagram of block anchors for online log parsing, according to some embodiments.

FIG. 1 illustrates a logical diagram of block anchors for online log parsing, according to some embodiments. Online parser 110 may be a stand-alone log parser or implemented as part of a service or other application, such as log parsing 214 in an operations or other log analysis service as described below with regard to FIG. 2. Online log parser may receive log entries, like log entry 102, and implement log tokenization 120 to generate an ordered series of log units, like log entry 102 with log units 104*a*, 104*b*, 104*c*, and so on, according to the techniques discussed in detail below with regard to FIGS. 3-6. For example, log tokenization 120 may recognize both raw blogs of characters and token units.

Anchor token template matching 130 may then perform various matching techniques for log templates based on anchor tokens identified as corresponding to log units 104, according to the various techniques discussed below with regard to FIGS. 3-7. For example, techniques to search a log template pool 140 which may have been initialized using previously received log entries and initialization and/or update techniques, as described below with regard to FIG. 3, may be used to then provide a matching parsed log entry 109, which may include both the parsed log entry 102, with log units 104*a*, 104*b*, 104*c*, and so on, as well as a corresponding log template 106 with anchor token 108*a*, as well as other template units 108*b* and 108*c* (e.g., discussed in detail below with regard to FIG. 4).

Please note that the previous description of block anchors for online log parsing is a logical illustration and thus is not to be construed as limiting as to the implementation of various other embodiments.

This specification continues with a general description of a provider network that implements multiple different services, including an operations analysis service, which may implement block anchors for online log parsing techniques used to support various analysis features. Then various examples of, including different components/modules, or arrangements of components/module that may be employed as part of implementing the services are discussed. A number of different methods and techniques to implement block anchors for online log parsing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
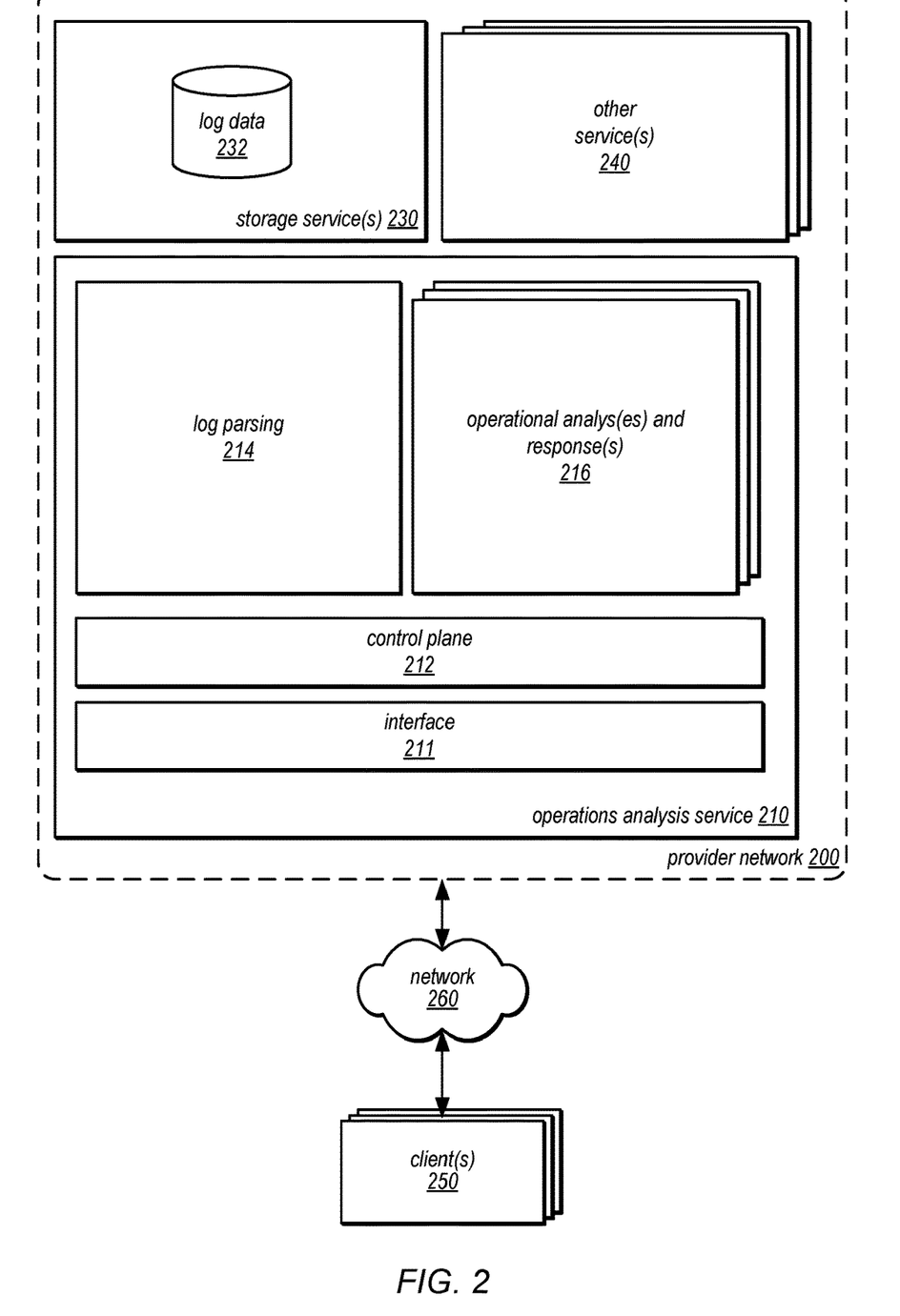
FIG. 2 illustrates an example provider network that may implement an operations analysis service that implements block anchors for online log parsing, according to some embodiments.

FIG. 2 illustrates an example provider network that may implement an operations analysis service that implements block anchors for online log parsing, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as operations analysis service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of operations analysis service 210 may be implemented by a particular node or may be distributed across several nodes. In some embodiments, a given node may implement the functionality of more than one service system component (e.g., more than one data store component).

Operations analysis service 210 may implement interface 211 to allow clients (e.g., client(s) 250 or clients implemented internally within provider network 200, such as a client application hosted on another provider network service like an event driven code execution service or virtual compute service) to analyze operational data submitted as logs. For example, operations analysis service 210 may implement interface 211 (e.g., a graphical user interface, programmatic interface that implements Application Program Interfaces (APIs) and/or a command line interface) may be implemented so that a client application can submit a log data stream directly from producing applications or services (e.g., hosted in other service(s) 240 or externally from provider network 200) and/or from log data 232 stored in storage service(s) 230, or other storage locations or sources within provider network 200 or external to provider network 200 (e.g., on premise data storage in private networks). Interface 211 may allow a client to request the performance of operations analysis, as well as configure or specify various features, like various configurable parameters for log parsing 214.

Operations analysis service 210 may implement a control plane 212 to perform various control operations to implement the features of operations analysis service 210. For example, control plane may monitor the health and performance of requests at different components log parsing 214 and operational analyses and responses 216 (e.g., the health or performance of various nodes implementing these features of operations analysis service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Operations analysis service 210 may implement log parsing 214, discussed in detail below with regard to FIG. 3 and operational analys(es) and respons(es) 216, which may perform various kinds of machine learning to analyze, visualize, detect operational issues, resolve issues and/or provide action recommendations. The performance of operational analys(es) and response(s) 216 may depend upon the ability of log parsing 214 to quickly and accurately parse the content of various received logs on behalf of various clients of provider network 200. Thus, performance improvements in log parsing 214 may have direct implications on the performance, and thus the speed in which, for example, operational analys(es) and response(s) 216 can detect serious operational failures in a client system.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs), command line interfaces and/or graphical user interfaces.

Generally speaking, clients 250 may encompass any type of client that can submit network-based requests to provider network 200 via network 260, including requests for operations analysis service 210 (e.g., a request to configure parsing, implement or perform one or more operational analyses, configure responses, take action with respect to recommendations etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of operations analysis service 210 to implement various features. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like operations analysis service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
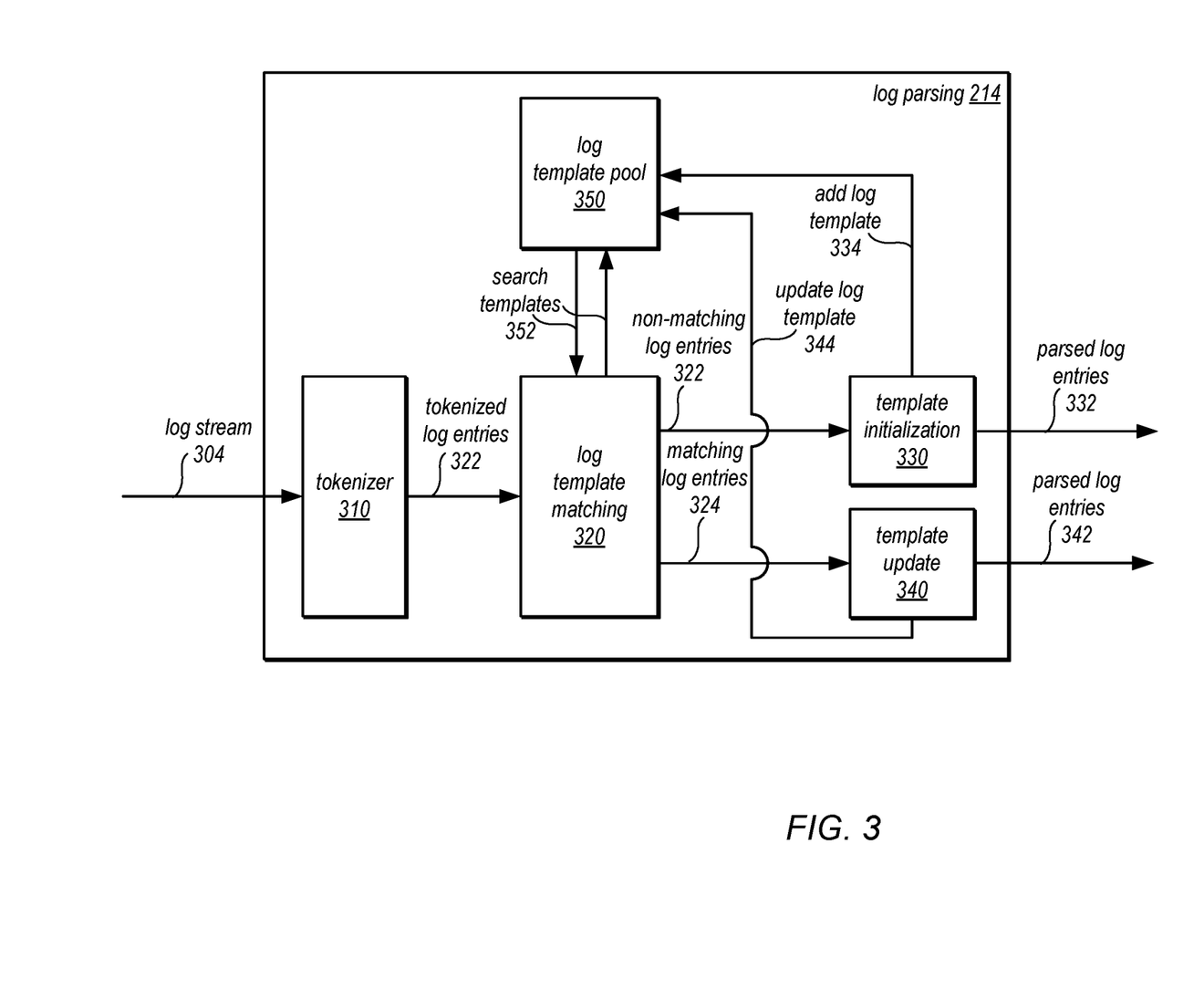
FIG. 3 illustrates a logical block diagram of an online log parser that uses block anchors for online log parsing, according to some embodiments.

FIG. 3 illustrates a logical block diagram of an online log parser that uses block anchors for online log parsing, according to some embodiments. Log parsing 214 may implement tokenizer 310, which may accept log entries from log stream 304. Tokenizer 310 may breaks down a raw log entry into an ordered series of units. There are also two types of units in the tokenized log entries, log token and raw block, which correspond to template token and template block respectively. In the tokenization process, blocks are firs captured by pre-designed regular expression patterns, as discussed in detail below. There might be overlapping blocks captured by the regular expression patterns. In this case, the foremost one will be considered a block and all other ones that overlap with it will not be considered. The block substructures identified in this process may be considered raw blocks, which correspond to the template blocks in log templates.

After blocks are identified, the remaining text are split into log tokens with a set of separator characters such as white spaces, tab, etc. The users could define their own set of separators, while an example of these separators are provided below. This process eventually convert a string of log message to a list made of log tokens and raw blocks. Example separators may include a regular expression "[\s\t; \n]+ that captures text, such as ",".

Tokenized long entries 322 may then be provided to log template matching 320, which may implement the techniques discussed below with regard to FIG. 7 to search for matching log templates 352 from log template pool 350. Matching log entries 324 may have template update performed, as indicated at 340 and discussed in detail below, which may include updating template values and updating statistics (e.g., the counter) collected for the log entry template before provided the parsed log entries 342 with matching log template. An update to the log template, as indicated at 344 in log template pool 350 may be made.

As indicated at 322, non-matching log entries may be provided to template initialization 330, which may initialize a log template for the log entry, as discussed in detail below. The parsed log entry and initialized log template may be provided, as indicated at 332 for further downstream processing. As indicated at 334, the initialized log template may be added to template pool 350 for reuse for subsequent log entries.

Figure 4:
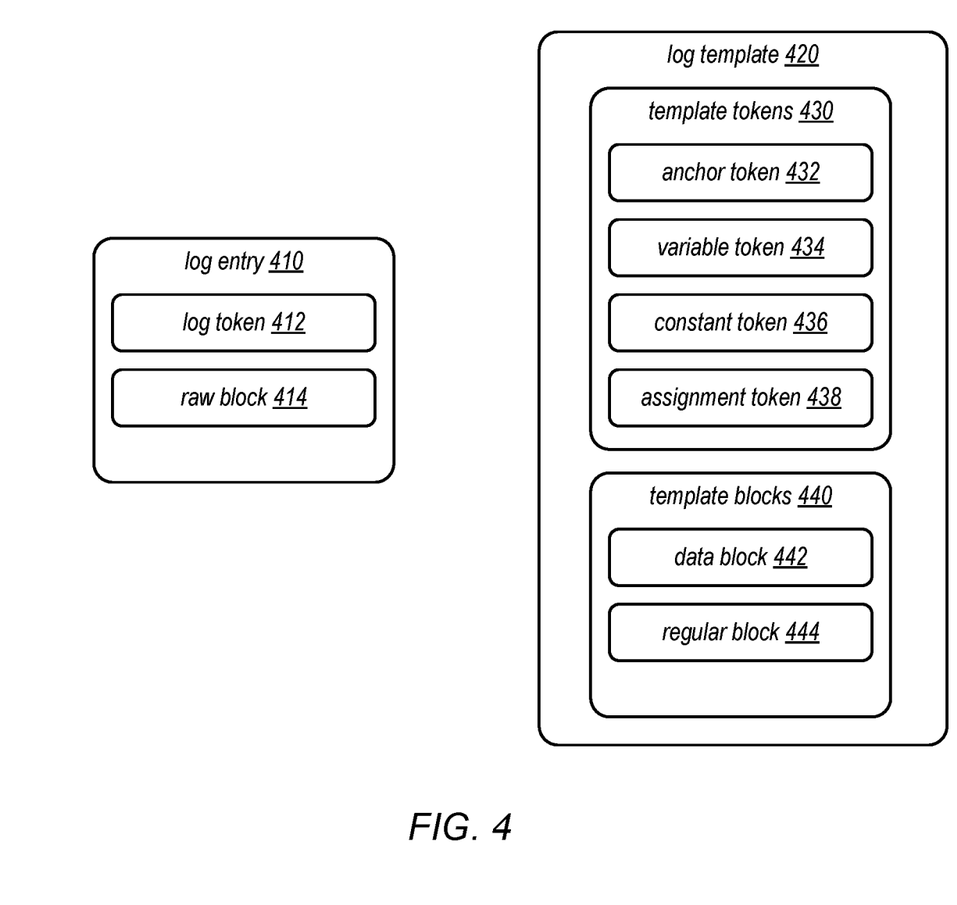
FIG. 4 illustrates a logical block diagram for log entries and log templates, according to some embodiments.

FIG. 4 illustrates a logical block diagram for log entries and log templates, according to some embodiments. A tokenized log entry 410 may include an ordered sequence of units, which may include one or more log tokens 412 and/or one or more raw blocks 414.

As illustrated in FIG. 4, a log template 420 can include template tokens 430 and template blocks 440. Template tokens 430 may represents a unit in a log format that are naturally isolated from others by white spaces or similar control characteristics. A template token usually cannot be further partitioned without loss of semantic meaning. One example of a template token, is an anchor token 432. An anchor token represents an invariant unit in a log format, whose value has certain patterns that make us believe that it is unlikely to change. For example, a token value made of purely letters, or purely control characters within a certain length are usually considered anchor tokens, although this can also be defined by the user. Examples of regular expression patterns for capturing anchor tokens are discussed in detail below. Anchor tokens play an important role in accelerating the template matching process, which will be discussed in further detail below.

Another example of a template token is a variable token 434. A variable token represents a variant unit (variable) in a log format whose value may change among different log entries that have the same log format. They may correspond to the variant parts (parameters) in the logging statement in the source code.

Another example of a template token 430 is a constant token 436. A constant token 436 may represents an invariant unit in a log format. The difference between constant tokens and anchor tokens is that constant tokens do not need to have certain patterns, and so there may be less confidence in its value being static. Although it is a constant based on the current information, it may be easily converted to a variable token under certain conditions.

Another example of a template token 430 may be an assignment token 438. An assignment token 438 may represents a unit in the form of a key-value pair, such as "latency=100". It may be a special complex token type made of two parts, an invariant part (key) and variant part (value). The invariant part works similarly as anchor tokens in template matching. The variant part contains another variable token as the child token of the assignment token.

Template blocks 440 may represents a substructure called block in a log format. A block may be a substring surrounded by paired brackets, parentheses, quotation marks or similar pairs of control characters in a log entry, where the brackets, parentheses, quotation marks or similar characters inside the block, if they are of the same type as the surrounding pair, also need to be balanced. For example, in the following log entry "Received response {"action":"status", "responseFor": "processRecords"} from subprocess while waiting for processRecords while processing shard shardId-000000000007", the portion {action": "status", "responseFor": "processRecords"} is considered a block.

One example of a template block 440, may be a data block 442. A data block 442 may a block in a log format that follows a known syntax. For example {"action":"status", "responseFor":"processRecords"} in the above example follows the JavaScript Object Notation (JSON) syntax and thus can be parsed directly by a third-party JSON parser. The list of known syntax and corresponding third-party parsers can be defined in one or more requests to log parsing 214 submitted via an interface supported by operations analysis service 210 (or other interface to log parsing 214). The structure of the data block may be represented as tree-like structure called a content tree, whose leaves are variable tokens, in some embodiments.

Another example of a template block 440 may be a regular block 444. A regular block 444 may represent a block in a log format that does not follow any known syntax. As the content of a block is free-form text, each regular block may have a block parser which works in the same way as the root parser does to extract block formats and represents them as block templates. There might be blocks in a block template as well. This may generate the hierarchy of the log format representation in the proposed method.

Figure 5:
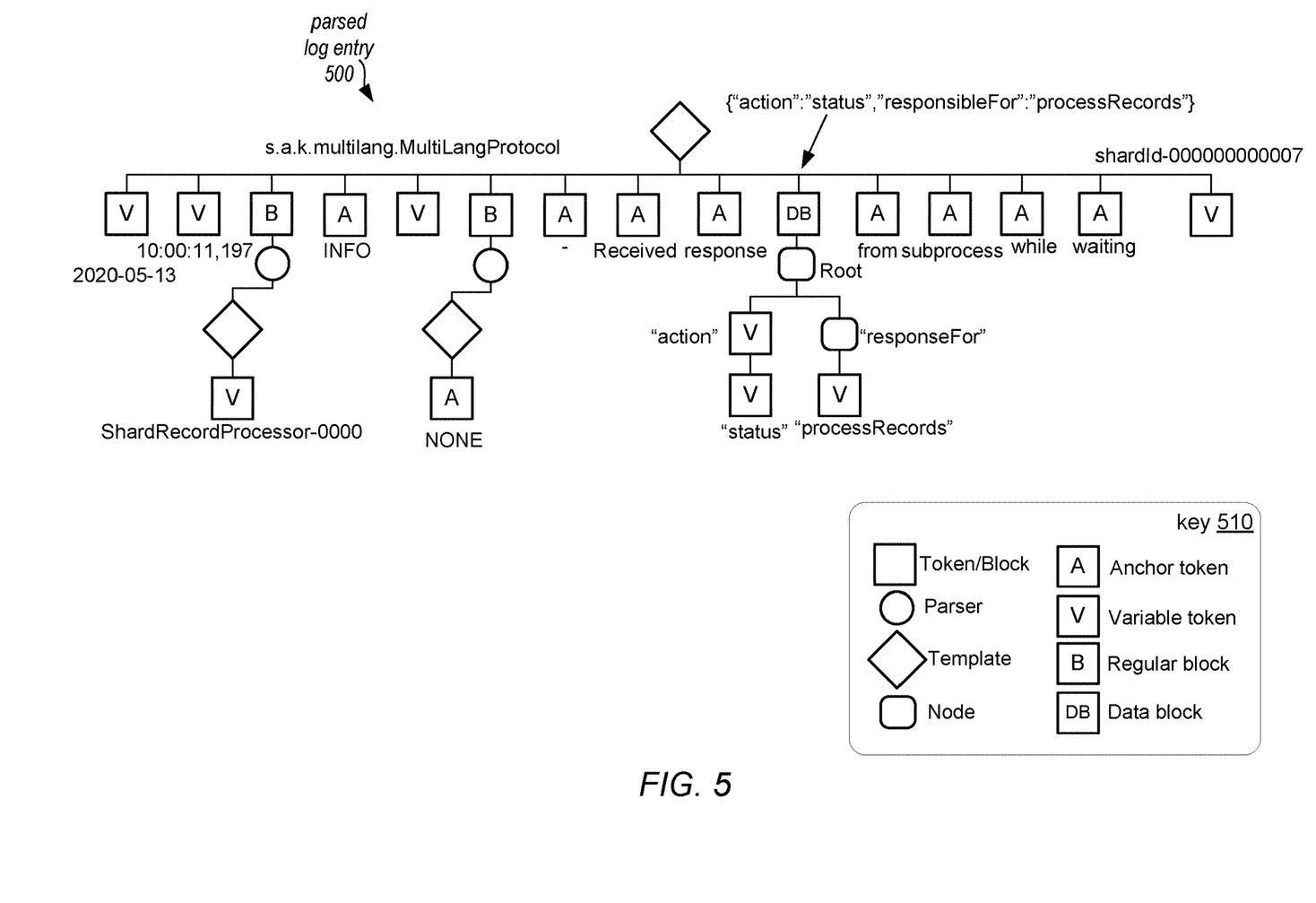
FIG. 5 illustrates an example parsed log entry, according to some embodiments.

FIG. 5 illustrates an example parsed log entry, according to some embodiments. Parsed log entry 500 may show a final log template after parsing the following exemplary log entry:

2020-05-13 10:00:11, 197 [ShardRecordProcessor-0000] INFO s.a.k.multilang.MultiLangProtocol [NONE]— Received response {"action":"status", "responseFor":"processRecords"} from subprocess while waiting for processRecords while processing shard shardId-000000000007

Key 510 indicates the different block and token types that may have been identified using the above (and below) discussed parsing techniques for this example.

Although FIGS. 2-5 have been described and illustrated in the context of a provider network implementing an operations analysis service, the various components illustrated and described in FIGS. 2-5 may be easily applied to other systems that implement log parsing. As such, FIGS. 2-5 are not intended to be limiting as to other embodiments of block anchors for online log parsing.

Figure 6:
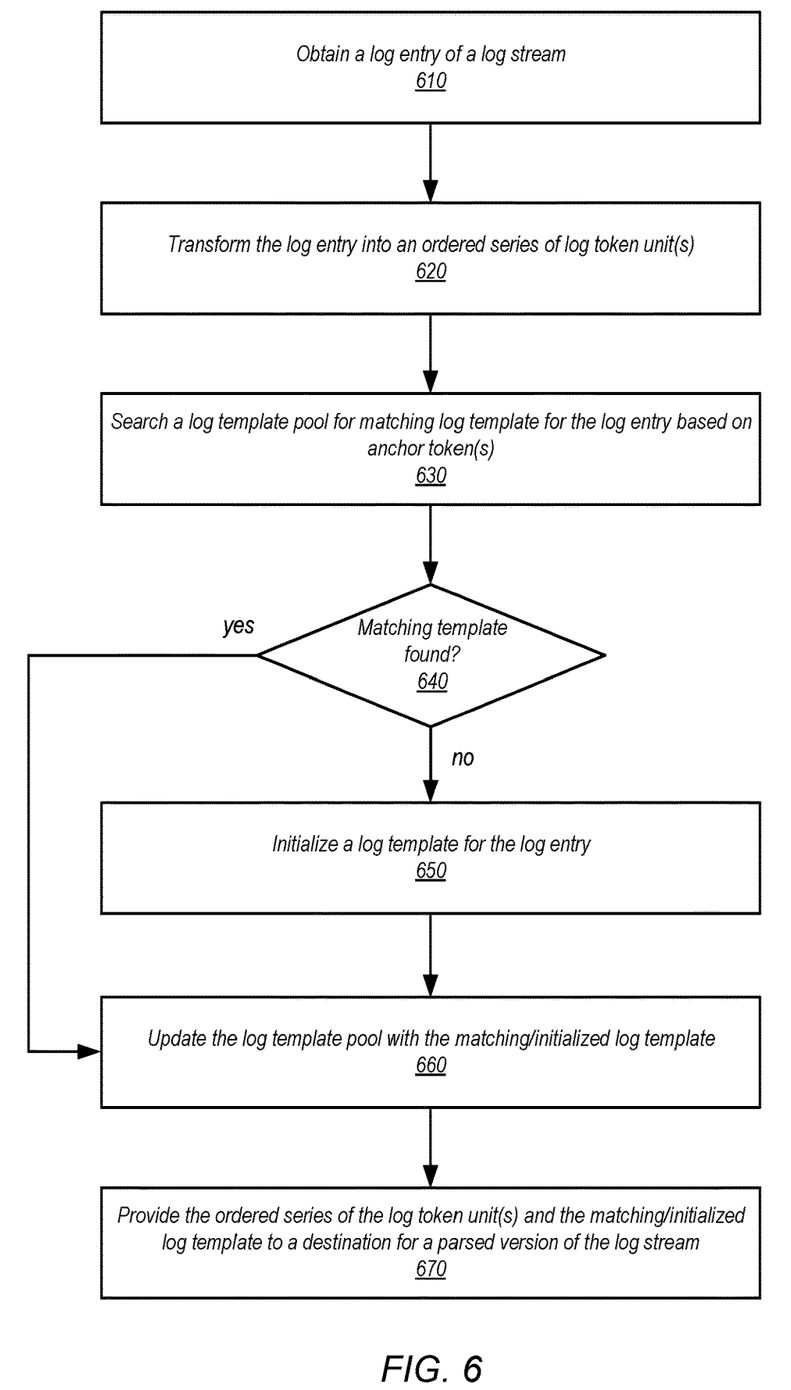
FIG. 6 illustrates a high-level flowchart of various methods and techniques to implement block anchors for online log parsing, according to some embodiments.

FIG. 6 illustrates a high-level flowchart of various methods and techniques to implement block anchors for online log parsing, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, a log entry of a log stream may be obtained, in various embodiments. For example, the log entry may be read or retrieved from a data store for the log stream. In some embodiments, the log entry may be obtained as part of a data stream or other transmission that directs log entries to the endpoint or interface of a service, such as the operations analysis service 210. As indicated at 620, the log entry may be transformed into an ordered series of log token units, in some embodiments. For example, the tokenization techniques discussed above with regard to FIGS. 3 and 4 that identifies log tokens and raw blocks may be performed.

As indicated 630, a log template pool for matching log templates of the log entry based on anchor token(s) may be searched, in some embodiments. For example, as discussed above with regard to FIG. 3 and below with regard to FIG. 7, a search technique that utilizes different matching techniques to provide an efficient ordering for locating a matching template may be provided. In other embodiments, however, only one matching log template technique (e.g., a full log unit or a select log unit) may be performed to search a log template pool for based on anchor token(s).

As indicated by the negative exit from 640, if no matching template is found, then a log template may be initialized for the log entry, as indicated at 650. For example, as discussed above, the template initialization process takes a tokenized log entry as input, and outputs a new log template which represents the log format that the given log entry has. The initialization of a template is done by initializing all the template units from the log units at the same positions.

A corresponding log token as one of the ordered log units may be used to initialize a template token. For instance, the following techniques describe example for initializing different template token types. For an assignment token, the template may be initialized using the result of one or more assignment regular expression patterns. Such assignment regular expression patterns may include:

"^\W?\"?([^\()\{\}\[\]\;\=,\:\"]{1,25})\"?(?:=)\"?([^\()\{\}\[\]\;\=,\:\"]+)\"?\W{@0,2}$ which may capture text such as "latency=100" or "^\W?\"?([^\()\{\}\[\]\;\=,\:\"]{1,15})\"?(?:=)\"?([^\()\{\}\[\]\;\=,\:\"]+)\"?\W{@0,2}$ which may capture text such as "latency: 100". For an anchor token, the template may be initialized using the result of one or more anchor token regular expression patterns and not in any anchor exclusion word list. Such anchor token regular expression patterns may include:

^[a-zA-Z_]{2,20}\:?$
which may capture regular text,
^[\"\""][a-zA-Z]{2,30} [\"\""]\:$
which may capture example text like "Response_Latency":, or
^\W{1,5}$
which may capture example text like " . . . ". Excluded words for anchor tokens may be specified, such as
{'Jan', 'Feb', 'Mar', 'Apr', 'May', 'Jun', 'Jul', 'Aug', 'Sept', 'Oct', 'Nov', 'Dec'}. For a variable token, initialization may be determined based on a variable token regular expression search pattern, which may include examples like:
\d{2,4}-\d{1,2} $, which may capture text such as "2020-05-16",
^\d{1,2}-\w{3,4}-\d{2,4} $, which may capture text such as "16-May-20",
^\W?\d{1,2}/w{3,4}\W?$, which may capture text such as "[16/May/2020"
^\d{1,2}:\d{1,2}:\d+.*$, which may capture text such as "16:59:01.7467",
^\W?\w*(?: ID|Id|id)-\d+\W?$, which may capture text such as "<shardId-0000000012>".
^(?: \d{1,3} \.){3} \d{1,3} $, which may capture text such as "10.0.177.77",
^\W{0,2} \d+\W{0,2} $, which may capture text such as "12345", ^(?: V.*){3}$, which may capture text such as "opt/cloud/python3.6/lib/python3.6/lib-dynload/_ctypes.cpython-36m-x86_64-linux-gnu.so(ffi_call_unix64++0x4c)", or
^\W?(?: \[\w+(?:\]\\))\W?$, which may capture text such as "[0x7f75a4b1ef8]]".

For a constant token, any token not initialized as an assignment token, anchor token, or variable token may be initialized as a constant token.

Template blocks may be initialized as regular blocks or data blocks. The condition for initializing a data block is that the raw block follows a known syntax and can be parsed using a corresponding third-party parser. Otherwise, a regular block will be initialized. For instance, if the block is found to follow JSON syntax it will be parsed by a JSON parser where the raw string will be converted to a nested data structure made of name-value pairs and arrays. For example, once a raw block is identified to follow a known syntax, its content will then be parsed by the corresponding third-party parser into a nested data structure of key-value pairs and arrays. This parsed data will then be used to initialize the content tree of the data block. The algorithm of initializing a data block from the parsed data is shown below. This process may be done in a recursive way:

```
function data_block_initialization(data)
    db<–instantiate a data block
    db.node<–data_block_node_initizliation(data, db, 'root')
    return.db
end function
function data_block_node_initialization (data, parent, name)
    dbn<–instantiate a data block node
    dbn.parent<–parent
    dbn.name<–name
    IF data is a dictionary
        FOR each name-value pair
            add a child node data_block_node_initalization(value, dbn, name)
            to dbn
                FOR each element excluding the first element
                    update child node named 'array_item'
                END FOR
    ELSE IF data is an array
        IF data only has one element
            add child node data_block_node_initialization
            (element, db, 'array_item')
        ELSE
            add child node data_block_node_initialization
            (first element, dbn, 'array item')
            FOR each element excluding the first element
                update child node named 'array_item'
            END FOR
        END IF
    ELSE
        dbn.token<–initialize a variable token with data
    return dbn
END function
```

Regular block initialization may be performed, in various embodiments. The initialization of a generic block is also processed in a recursive way. The content of a raw block (i.e. text of the raw block without the surrounding character pair) will first be tokenized into a ordered series of log units made of tokens and possibly other raw blocks, following the same tokenization process as described in the previous section. Then a block template will be initialized from the tokenized block content following the same process as described in this section. This same process recursively repeats if there are child regular blocks to be initialized during the process, until there is no further regular block to be initialized. This process eventually results in a hierarchical structure in the initialized log template.

As indicated at 660, the log pool template may be updated with the matching/initialized log template. The initialized log template may be added to the log template pool. For a matching log template in the log template, the log template may be updated in various ways.

For example, updating a template token could involve two steps, token type conversion (if necessary) and counter property update. Token type conversion occurs when an anchor token or a constant token is paired with a log token with a value different from the value it has. In this case, the anchor token or constant token will be converted to a variable token. The counter property update process updates the counter property of a template token with the value of the paired log token. If the value exists in the counter, it simply increases the its occurrence count by 1. Otherwise, it adds the new value with its occurrence count being 1.

Updating a block may be performed in various ways according to whether the block is a regular block or a data block. For a data block, the update process includes updating its content tree using the parsed data of its paired raw block. The details of this process is illustrated in the algorithm below:

```
function data_block_update(data_block, raw_block)
    data<-parse the content of the raw_block by the third-party
    parser of data blocks
    data_block_node_update(data_block.root, data)
END function
function data_block_node_update(db_node, data)
    IF data is a dictionary
        FOR each name-value pair
            IF name exists in db_node.children
                data_block_node_update(db_node.children[name], data[name])
            ELSE
                add a child node data_block_node_initialization
                (value, dbn, name to db_node
            END IF
        END FOR
    ELSE IF data is an array
        FOR each element in data:
            IF 'array_item' exists in db_node.children:
                data_block_node_update(db_node.children['array_item'],
                data['array_item'])
            ELSE
                add child node data_block_node_initialization
                (element, dbn, 'array_item')
            END IF
        END FOR
    ELSE
        IF db_node has token attribute
            do token update to db_node.token
        ELSE
            db_node.token<-initialize a variable token with data
END function
```

For a regular block, the update process includes further parsing the content of the raw block. This involves tokenizing the content of the raw block and finding the matching block template from the block's template pool through exactly same template matching process as described in the Template Matching section. If a matching block template is found, all units in the block templates will be updated by their log units counterparts. If the block template contains other regular blocks again, this process continues recursively, until there is no further regular block found in the block template. If there is no matching block template found, a new block template will be initialized. The following algorithm illustrates the regular block update process:

```
function regular_block_update(regular_block, raw block):
    tokenized the content of raw_block as a list of units
    find the matching block template in the pool of the
    block parser of regular blocks
    IF a matching template block is found
        FOR each (template unit, log unit) pair
            IF the template unit is a template token
                update the template token with log unit
            ELSE IF the template unit is a data block
                update the template block with log unit
            ELSE IF the template unit is a regular block
                regular_block_update(template unit, log unit)
            END IF
        END FOR
    ELSE
        initialize a block template by the tokenized raw_block content
END function
```

In some scenarios, a template block-raw block pair can be further parsed into smaller unit pairs in a recursive way until there is not block that can be further parsed. The block parsing process is actually very similar to the block update process in terms of finding all template token-log token pairs, except that the template tokens in the pairs do not need to be updated. More specifically, the parsing process of a data block is illustrated in the following algorithm:

```
function data_block_parse(dat_block, raw_block)
    data<-parse the content of the raw_block by the
    third-party parser of data blocks
    data_block_node_parse(data_block.root, data)
END function
function data_block_node_parse(db_node, data)
    IF data is a dictionary
        FOR each name-value pair
            IF name exists in db_node.children:
                yield from data_block_node_parse
                (db_node.children[name], data[name])
            ELSE
                add a child node by calling
                    data_block_node_initialization(value, dbn, )
                yield from data_block_node_parse
                (db_node.children[name], data[name])
            END IF
        END FOR
    ELSE IF data is an array
        FOR each element in data:
            IF 'array_item' exists in db_node.children:
                yield from data_block_node_parse
                (db_node.children['array_item'], data['array_item'])
            ELSE:
                add a child node by calling
                    data_block_node_initialization(value, dbn, )
                yield from data_block_node_parse
                (db_node.children[name], data[name])
            END IF
        END FOR
    ELSE
        IF db_node has token attribute
            yield the (db_node.token, data) pair
        ELSE
            db_node.token<-initialize a variable token with data
            yield the (db_node.token, data) pair
END function
```

The parsing process of a regular block, may be illustrated in the following algorithm:

```
function regular_block_parse(regular_block, raw_block):
    tokenized the content of raw_block as a list of log units
    find the matching block template in the template
    pool of the block parser of regular blocks
    IF a matching template block is found
        FOR each (template unit, log unit) pair
            IF the template unit is a template token
                yield the (template unit, log unit) pair
            ELSE IF the template unit is a data block
                yield the (template unit, log unit) pair
            ELSE IF the template unit is a regular block
                yield from regular_block_parse(template unit, log unit)
            END IF
        END FOR
    ELSE
        initialize a block template by the tokenized raw_block content
        FOR each (template unit, log unit) pair
            IF the template unit is a template token
                yield the (template unit, log unit) pair
            ELSE IF the template unit is a data block
                yield from data_block_parse(template unit, log unit)
            ELSE IF the template is a regular block
                yield from regular_block_parse(template unit, log unit)
            END IF
        END FOR
END function
```

As indicated at 670, the ordered series of the log token unit(s) and the matching/initialized log template may be provided to a destination for a parsed version of the log stream, in some embodiments. For example, various log analyses may have been specified for the log stream, each of which may have a separate analysis component that operates on the parsed log entries of the log stream at a corresponding location (e.g., at a network endpoint). In some embodiments, processing may be performed in a single pipeline for multiple analyses, so the parsed log entries may be sent to a single destination. In some embodiments, the parsed log entries may be sent to a storage location for later retrieval or access.

In some embodiments, the techniques described above may implemented without recognizing blocks in the log template representation. This may provide a more efficient parsing technique and higher parsing speed when recognition of block substructures is not beneficial. In some embodiments, a request to a log parser may specify this as a configuration setting or parameter to choose whether (or not) to recognize blocks as part of log entry parsing.

To perform the techniques above without recognizing blocks, the following features may be implemented. For example, a log template may be an ordered list of template tokens (e.g., without template blocks). Tokenization of a log entry in such a technique may only split the log entry into tokens by separators specified for the parser. This may convert a log message as a string of characters, for example, into a list of log tokens. Template initialization may initialize template units with their log unit counterparts. This technique may also use two template matching algorithms, selective and full, as discussed in detail below. And the process of finding a matching template given a log entry stays the same as block anchor parser has. As blocks are not in template units types, the definition of mismatch may be slightly different, which may be defined as:

mismatch score=# of mismatched anchor tokens/(# of matched anchor tokens+# of matched The template matching process takes a tokenized log entry as input and tries to find a matching log template from the template pool. The matching process iterates over all log templates in the pool that have the same number of unit as the given log in two rounds. In the first round, it tries to match the log entry to a log template through the fast matching algorithm. If it finds a matching template, the process stops and returns the matching template. Otherwise, it runs a second round of matching using a different algorithm. If, after two rounds of template matching no matching log template is found, the parser will decide that the given log entry has an unseen format and will trigger the template initialization process, discussed above.

Figure 7:
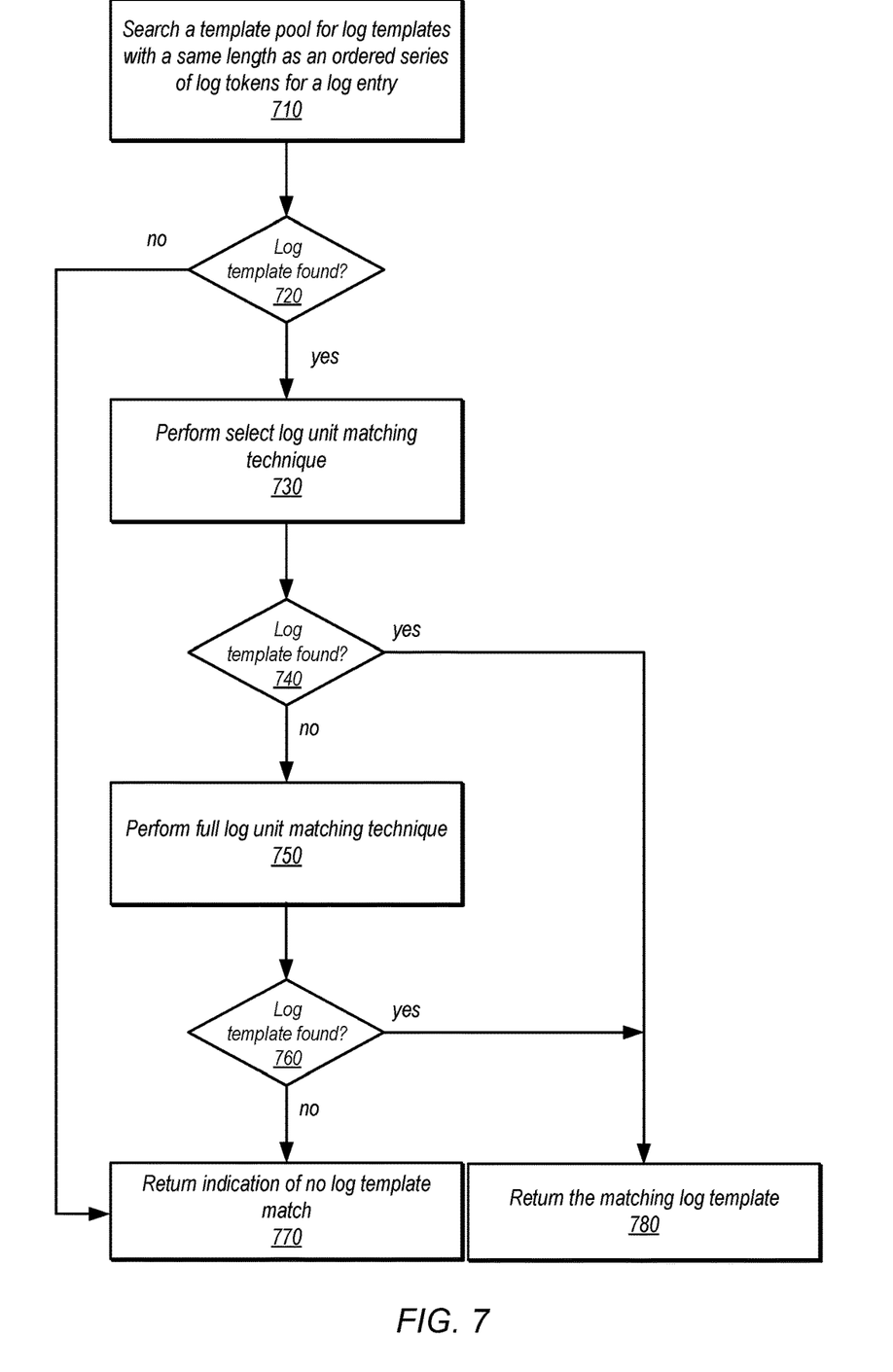
FIG. 7 illustrates a high-level flowchart of various methods and techniques to implement log template matching, according to some embodiments.

FIG. 7 illustrates a high-level flowchart of various methods and techniques to implement log template matching, according to some embodiments. As indicated at 710, a template pool may be searched for log templates with a same length as an ordered series of log tokens for an entry, in some embodiments. If no template of the same length is found, then return an indication of no matching log template may be returned, as indicated at 770.

As indicated at 730, a select log unit matching technique may be performed to locate a matching log template, in some embodiments. The select log unit matching technique may be a "fast" matching technique, as it may consider a subset of information in order to detect a match. For example, this technique may be designed to make quick decisions by only checking template units of certain types with their log unit counterparts. The specific matching conditions for different template unit types and whether they are considered in fast matching are summarized in the following table. The fast matching process check each template unit-log unit pair in an order if the template unit type is a considered one. The process fails and stops immediately when a pair fails to match. The matching succeeds if there is no mismatch after checking all pairs.

The following table describes matching conditions:

| | A | B | C |
|---|---|---|---|
| 1 | Token Block Type | Used in Fast Match | Matching Condition |
| 2 | Anchor token | Y | The log counterpart is a log token and it matches the value of the anchor token exactly. |
| 3 | Variable token | N | The log counterpart is a log token |
| 4 | Constant token | N | The log counterpart is a log token and it matches the value of the constant token exactly. |
| 5 | Assignment token | Y | The log counterpart is a log token and it matches the same regular expression pattern of the assignment token And the key name matches the key name of the assignment token |
| 6 | Regular block | Y | The log counterpast is a raw block And the raw block and template block have the same pair of outermost brackets, parentheses or quotation marks. |
| e | Data block | Y | The log counterpart is a raw block And the raw block can be parsed by the same rule based parser of the template block |

Table 1

If a log template match is found, as indicated by the positive exit from 740, then the log template match may be returned, as indicated at 780. If not, then, a full log unit matching technique may be performed, as indicated at 750. For example, this full or "regular" matching may take all template token types into consideration and checks all template unit-token unit pairs. The matching condition for different template unit types in regular matching stays the same as shown in the above table. Different from fast matching, regular matching succeeds even if there are mismatching pairs. In this case, the template units of the mismatching pairs will be converted to different suitable types.

In some embodiments, regular matching between a log template and a (tokenized) log entry succeeds if all of the following conditions are met,
1. Condition 1, All blocks (including both generic and data blocks) match their raw block counterparts.
2. Condition 2, All assignment tokens match their log token counterparts.
3. Condition 3, the mismatch score V ANCHOR_MISMATCH_THRESHOLD where ANCHOR_MISMATCH_THRESHOLD is a configuration parameter whose value could be adjusted by a user of the parser. The mismatch score may be defined as follows.

If a log template match is found, as indicated by the positive exit from 760, then the log template match may be returned, as indicated at 780. If not, then an indication of no matching log template may be returned, as indicated at 770.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
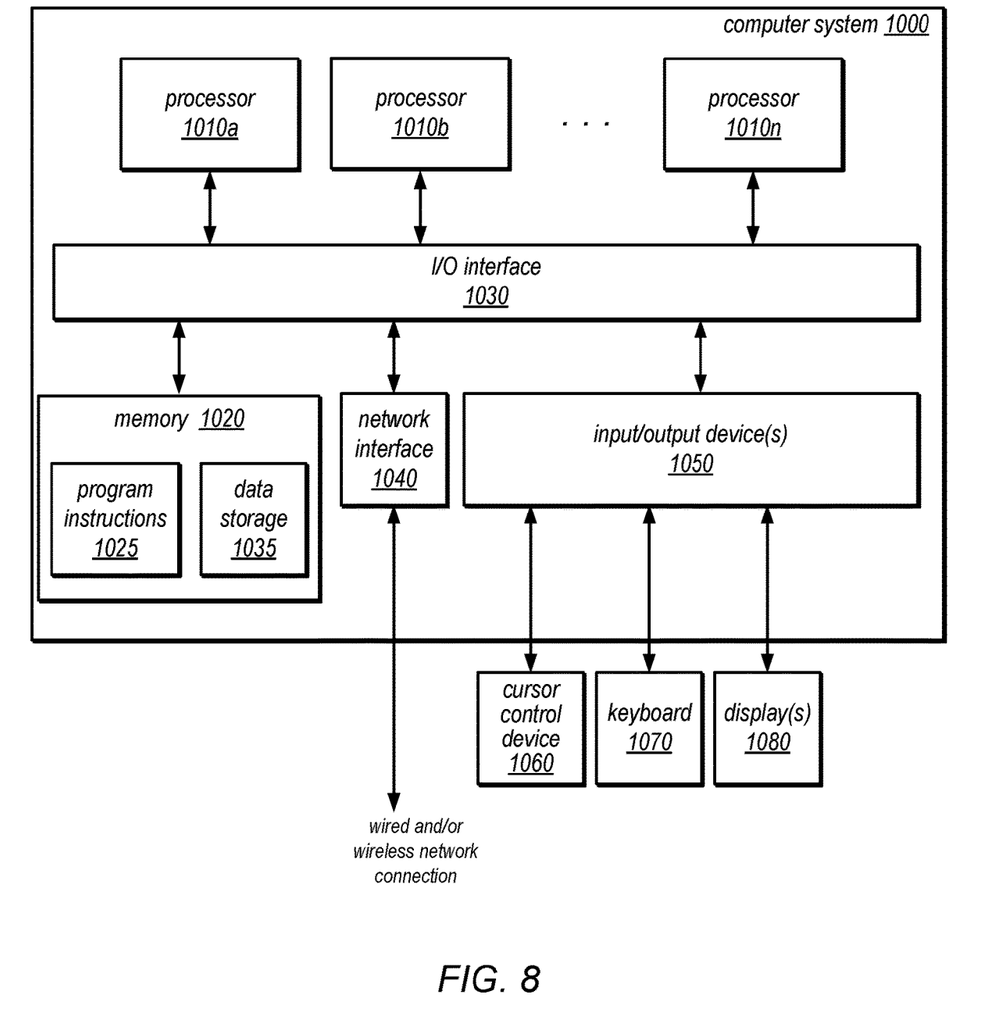
FIG. 8 illustrates an example system to implement the various methods, techniques, and systems described herein, according to some embodiments.

Embodiments of block anchors for online log parsing as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired features or techniques of self-supervised training for audio anomaly detection, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/ output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least processor, cause the at least one processor to implement:
      receive, at an online log parser, a log entry of a log stream;
      tokenize, by the online log parser, the log entry into an ordered series of a plurality of log token units;
      search a log template pool according to the ordered series of the plurality of log token units to determine that a previously initialized log template of a plurality of log templates in the log template pool matches the log entry, wherein individual ones of the log templates comprise respective ordered series of a plurality of template units, and wherein to search the log template pool, the online log parser is configured to:
         for the individual ones of the plurality of log templates:
            according to the ordered series of the plurality of log token units, check one or more individual log token units paired with a template unit in the respective ordered series of the template units that is an anchor token, for matching values unless a pair fails to match, wherein the respective ordered series of template units is determined according to which matching technique of a plurality of supported matching techniques is performed when checking the one or more individual log token units, and wherein the online log parser tries one or more of the plurality of supported matching techniques according to an order of increasing numbers of template units checked;
            wherein the one or more individual log token units paired with the template unit in the respective ordered series of the template units that is the anchor token in the previously initialized log template are determined to match; and
      send, by the online log parser, the ordered series of the one or more log token units and a log template based on the previously initialized log template to a destination for a parsed version of the log stream.

2. The system of claim 1, wherein the performed matching technique is a select log unit matching technique that considers a subset of token and block types to determine that the previously initialized log template is a match with the log entry.

3. The system of claim 1, wherein the performed matching technique is a full log unit matching technique that considers all token and block types to determine that the previously initialized log template is a match with the log entry after performance of a select log unit matching technique fails to identify a match.

4. The system of claim 1, wherein the online log parser is implemented as part of an operations analysis service of a provider network that performs one or more analyses on the log entry and log template at the destination for the parsed version of the log stream.

5. A method, comprising:
   obtaining, at an online log parser, a log entry of a log stream;
   transforming, by the online log parser, the log entry into an ordered series of a plurality of log token units;
   searching a log template pool according to the ordered series of the plurality of log token units to determine that a previously initialized log template of a plurality of log templates in the log template pool matches the log entry, wherein individual ones of the log templates comprise respective ordered series of a plurality of template units, and wherein to search the log template pool, and wherein the searching comprises:
      for the individual ones of the plurality of log templates:
         according to the ordered series of the plurality of log token units, checking one or more individual log token units paired with a template unit in the respective ordered series of the template units that is an anchor token, for matching values unless a pair fails to match, wherein the respective ordered series of template units is determined according to which matching technique of a plurality of supported matching techniques is performed when checking the one or more individual log token units, and wherein the online log parser tries one or more of the plurality of supported matching techniques according to an order of increasing numbers of template units checked;
         wherein the one or more individual log token units paired with the template unit in the respective ordered series of the template units that is the anchor token in the previously initialized log template for are determined to match; and
   providing, by the online log parser, the ordered series of the plurality of log token units and a log template based on the previously initialized log template to a destination for a parsed version of the log stream.

6. The method of claim 5, wherein the performed matching technique is a select log unit matching technique that considers a subset of token and block types to determine that the previously initialized log template is a match with the log entry.

7. The method of claim 5, wherein a full log unit matching technique that considers all token and block types to determine that the previously initialized log template is a match with the log entry after performance of a select log unit matching technique fails to identify a match.

8. The method of claim 5, wherein providing the ordered series of the one or more log token units and the log template based on the previously initialized log template to a destination for a parsed version of the log stream comprises updating a template token in the previously initialized log template to generate the log template.

9. The method of claim 5, wherein providing the ordered series of the one or more log token units and the log template based on the previously initialized log template to a destination for a parsed version of the log stream comprises updating a statistic for the previously initialized log template after determining that the previously initialized log template matches the log entry.

10. The method of claim 5, wherein the log template comprises a data block, wherein contents of the data block are determined by another parser corresponding to a recognized syntax of the data block.

11. The method of claim 5, wherein the log template comprises a regular block, wherein contents of the regular block are determined by recursively identifying one or more log template tokens within the regular block.

12. The method of claim 5, further comprising storing the log template as an updated version of the previously initialized log template as part of a log template pool for matching log templates for the log stream.

13. The method of claim 5, wherein the online log parser is implemented as part of a provider network service that performs one or more analyses on the provided log entry and log template at the destination for the parsed version of the log stream.

14. One or more non-transitory, computer-readable storage media, storing program instructions that when executed on or across one or more computing devices cause the one or more computing devices to implement:
  receiving, at an online log parser, a log entry of a log stream;
  tokenizing, by the online log parser, the log entry into an ordered series of a plurality of log token units;
  searching a log template pool according to the ordered series of the plurality of log token units to determine that a previously initialized log template of a plurality of log templates in the log template pool matches the log entry, wherein individual ones of the log templates comprise respective ordered series of a plurality of template units, and wherein to search the log template pool, and wherein the searching comprises:
    for the individual ones of the plurality of log templates:
      according to the ordered series of the plurality of log token units, checking one or more individual log token units paired with a template unit in the respective ordered series of the template units that is an anchor token, for matching values unless a pair fails to match, wherein the respective ordered series of template units is determined according to which matching technique of a plurality of supported matching techniques is performed when checking the one or more individual log token units, and wherein the online log parser tries one or more of the plurality of supported matching techniques according to an order of increasing numbers of template units checked;
    wherein the one or more individual log token units paired with the template unit in the respective ordered series of the template units that is the anchor token in the previously initialized log template for are determined to match; and
  providing, by the online log parser, the ordered series of the plurality of log token units and a log template based on the previously initialized log template to a destination for a parsed version of the log stream.

15. The one or more non-transitory, computer-readable storage media of claim 14, the performed matching technique is a select log unit matching technique that considers a subset of token and block types to determine that the previously initialized log template is a match with the log entry.

16. The one or more non-transitory, computer-readable storage media of claim 14, wherein the performed matching technique is a full log unit matching technique that considers all token and block types to determine that the previously initialized log template is a match with the log entry after performance of a select log unit matching technique fails to identify a match.

17. The one or more non-transitory, computer-readable storage media of claim 14, wherein, in providing the ordered series of the one or more log token units and the log template based on the previously initialized log template to a destination for a parsed version of the log stream, the program instructions cause the one or more computing devices to further implement updating a template block in the previously initialized log template to generate the log template.

18. The one or more non-transitory, computer-readable storage media of claim 14, storing further instructions that when executed on or across the one or more computing devices, cause the one or more computing devices to further implement storing the log template as an updated version of the previously initialized log template as part of the log template pool for matching log templates for the log stream.

19. The one or more non-transitory, computer-readable storage media of claim 14, wherein the log template comprises a data block, wherein contents of the data block are determined by another parser corresponding to a recognized syntax of the data block.

20. The one or more non-transitory, computer-readable storage media of claim 14, wherein the online log parser is implemented as part of a provider network service that performs one or more analyses on the provided log entry and log template at the destination for the parsed version of the log stream.

\* \* \* \* \*